US012755877B2

(12) United States Patent
Tanaka et al.

(10) Patent No.: US 12,755,877 B2
(45) Date of Patent: Oct. 6, 2026

(54) PARAMAGNETIC GARNET-BASED TRANSPARENT CERAMIC AND METHOD FOR PRODUCING SAME

(71) Applicant: Shin-Etsu Chemical Co., Ltd., Tokyo (JP)

(72) Inventors: Keita Tanaka, Annaka (JP); Masanori Ikari, Annaka (JP); Takuto Matsumoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 613 days.

(21) Appl. No.: 18/025,064

(22) PCT Filed: Aug. 18, 2021

(86) PCT No.: PCT/JP2021/030209

§ 371 (c)(1),
(2) Date: Mar. 7, 2023

(87) PCT Pub. No.: WO2022/054515

PCT Pub. Date: Mar. 17, 2022

(65) Prior Publication Data

US 2023/0335319 A1 Oct. 19, 2023

(30) Foreign Application Priority Data

Sep. 9, 2020 (JP) ................................ 2020-151196

(51) Int. Cl.
*C04B 35/44* (2006.01)
*C04B 41/00* (2006.01)
*H01F 1/00* (2006.01)

(52) U.S. Cl.
CPC ........... *H01F 1/0018* (2013.01); *C04B 35/44* (2013.01); *C04B 41/0063* (2013.01);
(Continued)

(58) Field of Classification Search
CPC .................. H01F 1/0018; C04B 35/44; C04B 2235/3224; C04B 2235/764
See application file for complete search history.

(56) References Cited

U.S. PATENT DOCUMENTS 5,013,696 A 5/1991 Greskovich et al.
2004/0035357 A1 2/2004 Sekijima et al.
(Continued)

FOREIGN PATENT DOCUMENTS

JP 2638669 B2 8/1997
JP 3642063 B2 4/2005
(Continued)

OTHER PUBLICATIONS

Stevens et al., "Promising Materials for High Power Laser Isolators", Laser Technik Journal, 2016, pp. 18-21, cited in Specification (4 pages).
(Continued)

*Primary Examiner* — Cameron K Miller
(74) *Attorney, Agent, or Firm* — WHDA, LLP

(57) ABSTRACT

A sintered body of Tb-containing rare earth aluminum garnet represented by formula (1)

$$(Tb_{1-x-y}Y_xSc_y)_3(Al_{1-z}Sc_z)_5O_{12} \quad (1)$$

(where 0<x<0.45, 0<y≤0.1, and 0.004<z<0.2), wherein: |a−b|≤10.1 when at least 900 nm<λ<1,100 nm, where, in terms of a total light transmittance spectrum on an optical path length of 24 mm, a % is the total light transmittance at the wavelength 900 nm and b % is the total light transmittance at any wavelength λ more to the long-wavelength side than 900 nm; and no thermal
(Continued)

lensing effect is produced even with respect to a 100-W laser output, allowing for use as a Faraday rotator of a high-power fiber laser.

9 Claims, 1 Drawing Sheet

(52) U.S. Cl.
CPC .. *C04B 41/0072* (2013.01); *C04B 2235/3222* (2013.01); *C04B 2235/3224* (2013.01); *C04B 2235/764* (2013.01); *C04B 2235/9653* (2013.01)

(56) References Cited

U.S. PATENT DOCUMENTS

| | | | |
|---|---|---|---|
| 2014/0002900 A1 | 1/2014 | Makikawa et al. | |
| 2016/0145765 A1* | 5/2016 | Matsui | G02F 1/0036 252/584 |
| 2018/0017816 A1 | 1/2018 | Matsumoto et al. | |
| 2019/0359496 A1 | 11/2019 | Tanaka et al. | |
| 2019/0366584 A1 | 12/2019 | Matsumoto et al. | |

FOREIGN PATENT DOCUMENTS

| | | | |
|---|---|---|---|
| JP | 4878343 | B2 | 2/2012 |
| JP | 5704097 | B2 | 4/2015 |
| JP | 5935764 | B2 | 6/2016 |
| JP | 2019-199387 | A | 11/2019 |
| JP | 2019-202916 | A | 11/2019 |
| JP | 2019-207340 | A | 12/2019 |
| WO | 2016/143859 | A1 | 9/2016 |

OTHER PUBLICATIONS

Aung et al., "Development of optical grade (TbxY1-x)3Al5O12 ceramics as Faraday rotator material", J. Am. Ceram. Soc., 2017, vol. 100, pp. 4081-4087, cited in Specification (7 pages).

International Search Report dated Sep. 28, 2021, issued in counterpart International Application No. PCT/JP2021/030209 (2 pages).

* cited by examiner

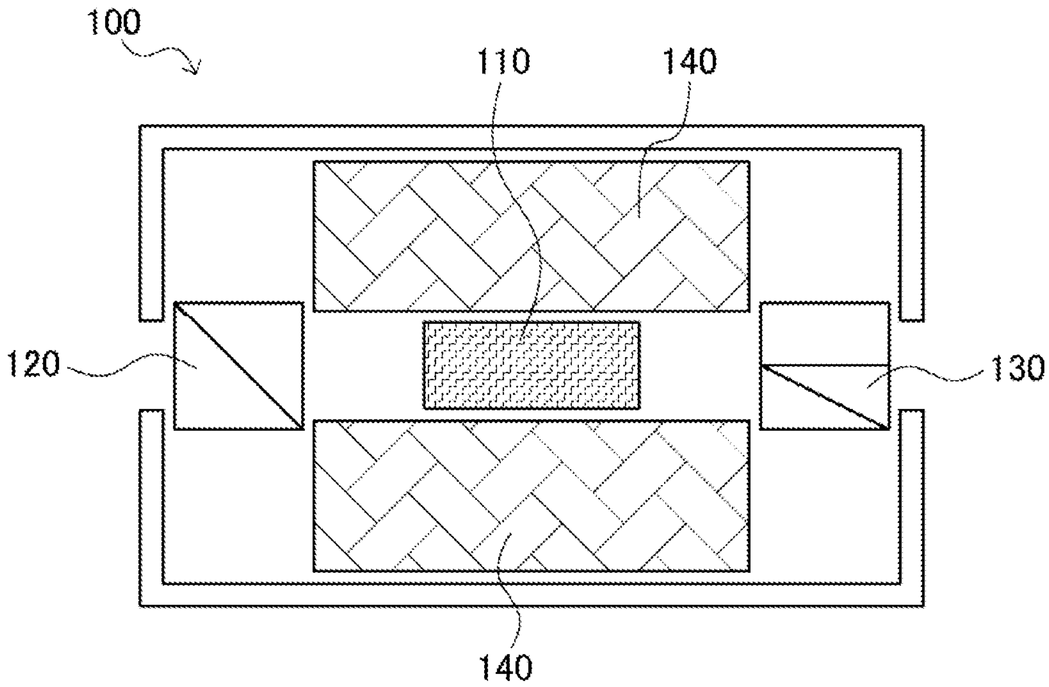
100
110
140
120
130
140

PARAMAGNETIC GARNET-BASED TRANSPARENT CERAMIC AND METHOD FOR PRODUCING SAME

TECHNICAL FIELD

This invention relates to a paramagnetic garnet type transparent ceramic material serving as magneto-optical material, and more particularly, to a magneto-optical material of terbium-containing paramagnetic garnet type transparent ceramic which is suitable for constructing magneto-optical devices such as optical isolators and can be used in high-power fiber lasers of at least 100 W. and a method of preparing the same.

BACKGROUND ART

As the output power of the latest lasers becomes higher, the laser processing by means of fiber lasers starts to assume prominence. For the stable operation of laser processing, it is necessary to remove external light so as not to disturb the oscillation state. Particularly when light is reflected on end surfaces of fibers, the reflected light reaches the laser light source and as a result, the oscillation state is greatly disturbed. Therefore, ordinary fiber lasers are constructed such that a part known as isolator is mounted at the boundary between coupling fibers to completely shut off the reflected light.

The optical isolator consists of a Faraday rotator, a polarizer disposed on the incident side of the Faraday rotator, and an analyzer disposed on the emergent side of the Faraday rotator. The Faraday rotator is utilized while applying a magnetic field parallel to the travelling direction of light. At this point of time, a polarized wave fraction of the light rotates only in a certain direction regardless of forward or backward travel through the Faraday rotator. Furthermore, the Faraday rotator is adjusted to such a length that the polarized wave fraction of the light is rotated by exactly 45 degrees. Herein, when the polarization planes of the polarizer and the analyzer are shifted by 45 degrees in the rotation direction of the forward traveling light, the polarized wave of the forward traveling light coincides at the position of the polarizer and at the position of the analyzer, allowing the forward traveling light to be transmitted. On the other hand, the polarized wave of the backward traveling light is rotated by 45 degrees in the direction opposite to the deviation angle direction of the polarization plane of the polarizer shifted by 45 degrees from the position of the analyzer. Then, the polarization plane of the return light at the position of the polarizer is shifted by 45 degrees− (−45 degrees)=90 degrees from the polarization plane of the polarizer, and the return light cannot be transmitted. In this way, the optical isolator functions to transmit and emit the forward traveling light and block the backward traveling return light.

Prior art materials used in Faraday rotators include, for example, terbium gallium garnet (TGG) of $Tb_3Ga_5O_{12}$ (e.g., in Patent Document 1: JP 4878343), rare earth based crystal of $(Th_xRe_{1-x})_2O_3$ (e.g., in Patent Document 2: JP 5704097), and potassium terbium fluoride (KTF) of $KTb_3F_{10}$ (e.g., in Non-Patent Document 1). It is understood that these materials commonly contain terbium having low light absorption at the wavelength 1,064 nm used as laser and a great Verdet constant (magneto-optical constant).

With the increasing output power of the latest lasers, the properties demanded for Faraday rotators vary, for example, a low light absorption coefficient is demanded rather than a great Verdet constant. If the Faraday rotator absorbs laser light, the light energy is converted to heat, inviting a temperature variation between the inside and the outer periphery of the Faraday rotator. The temperature variation directly leads to a refractive index variation, and the Faraday rotator has a refractive index distribution just like a lens. This is known as thermal lens effect, from which degradation of laser quality and variations of focal length are observed. The thermal lens effect is negligible in low power lasers. With the increasing laser power, the thermal lens effect becomes prominent because the Faraday rotator is heated at or above 40° C. Thus, the Faraday rotator for the high power application is required to have a low light absorption coefficient.

TGG generally used as the Faraday rotator has light absorption in the wavelength band of interest so that an output of 70 W is the limit. The rare earth-based crystal has the advantage that the Verdet constant can be maximized, but its light absorption coefficient is twice or more greater than that of TGG, from which it is expected that an output of 30 W is the limit. On the other hand, the fluoride crystal KTF is expected to comply with a laser power in excess of 400 W because of very low light absorption. As to KTF, however, many unknown factors remain from the aspects of crystal stability and manufacturing cost, and its Verdet constant is comparable to that of TGG, with a further improvement in Verdet constant being unexpectable. There is the demand for a material having low absorption and a high Verdet constant as compared with conventional TGG.

Known materials having lower absorption and a higher Verdet constant than TGG include $Tb_3Al_5O_{12}$, referred to as TAG, hereinafter (e.g., Patent Document 3: JP 3642063), $Tb_3Sc_2Al_3O_{12}$, refened to as TSAG, hereinafter (e.g., Patent Document 4: JP 5935764), and $(Y_xTb_{1-x})_3Al_5O_{12}$ (Non-Patent Document 2). Because of a Verdet constant which is about 1.4 times greater than that of TGG and low light absorption, these materials are believed to be mountable on fiber lasers of 100 W level. However. TAG is unstable as crystal and difficult to produce, and TSAG having a large content of expensive Sc is disadvantageous in cost. YTAG which is obtained by substituting Y for part of Tb in YAG is a promising material because it is a more stable crystal than TAG and does not contain an expensive element. However, neither the information of thermal lens in the high power region nor the information of light absorption loss at the mounted length (at least 14 mm) is described in Non-Patent Document 2. It is unknown from Non-Patent Document 2 alone whether or not the YTAG ceramic can be used as the high-power Faraday rotator.

PRIOR ART DOCUMENTS

Patent Documents

Patent Document 1: JP 4878343

Patent Document 2: JP 5704097

Patent Document 3: JP 3642063

Patent Document 4: JP 5935764

Non-Patent Documents

Non-Patent Document 1: Laser Technik Journal 13 (2016): 18-21

Non-Patent Document 2: J. Am. Ceram. Soc. 100 (2017), 4081-4087

SUMMARY OF INVENTION

Technical Problem

An object of the invention, which has been made under the above-mentioned circumstances, is to provide a paramagnetic garnet type transparent ceramic material which is a transparent sintered body of paramagnetic garnet oxide containing Tb, Y and Al, does not exert a thermal lens effect even at a laser power of 100 W, and can be used as the Faraday rotator for high-power fiber lasers; and a method of preparing the same.

Solution to Problem

So far the inventors developed a variety of transparent ceramics for the Faraday rotator. Making study on $(Tb_{1-x-y}Y_xSc_y)_3(Al_{1-x}Sc_z)_5O_{12}$ as the Faraday rotator for high-power application, the inventors ascertained that the absorption attributed to oxygen deficits or cation defects at the mounted length has a greater impact on the thermal lens effect than before. Making extensive investigations based on this discovery, the inventors have reached a transparent ceramic which minimizes the absorption of 1,064 nm band and minimizes the generation of thermal lens upon irradiation of 100 W laser.

The invention provides a paramagnetic garnet type transparent ceramic material and a method of preparing the same, as defined below.

1.

A paramagnetic garnet type transparent ceramic material which is a sintered body of Tb-containing rare earth aluminum garnet having the formula (1):

$$(Tb_{1-x-y}Y_xSc_y)_3(Al_{1-z}Sc_z)_5O_{12} \quad (1)$$

wherein $0<x<0.45$, $0<y\leq0.1$, and $0.004<z<0.2$, the paramagnetic garnet type transparent ceramic material meeting $|a-b|\leq0.1$ at least in the range: 900 m<λ<1,100 nm, provided that when a total light transmittance spectnun is determined across an optical path length of 24 mm, the total light transmittance at wavelength 900 nm is a % and the total light transmittance at an arbitrary wavelength λ on the wavelength side longer than 900 mu is b %.

2.

The paramagnetic garnet type transparent ceramic material of 1 wherein the minimum wavelength λ1 on the wavelength side longer than 900 nm which meets $|a-b|>0.1$ is at least 1,100 nm.

3.

The paramagnetic garnet type transparent ceramic material of 1 or 2, having an absorption coefficient of up to 0.0030 $cm^{-1}$ at wavelength 1,064 nm.

4.

The paramagnetic garnet type transparent ceramic material of any one of 1 to 3 wherein the total light transmittance at wavelength 900 nm is from 84% to 85%.

5.

The paramagnetic garnet type transparent ceramic material of any one of 1 to 4 wherein when laser light of wavelength 1,064 m across the optical path length 24 mm enters at a beam diameter of 1.6 mm and an incident power of 100 W, a variation of focal length by a thermal lens is less than 10%.

6.

A method of preparing the paramagnetic garnet type transparent ceramic material of any one of 1 to 5, comprising the steps of:

pressure-sintering a sintered body of a Tb-containing rare earth aluminum garnet having the formula (1):

$$(Tb_{1-x-y}Y_xSc_y)_3(Al_{1-z}Sc_z)_5O_{12} \quad (1)$$

wherein $0<x<0.45$, $0<y\leq0.1$, and $0.004<z<0.2$, heating the pressure-sintered body at a temperature higher than the pressure-sintering temperature for re-sintering, and oxidatively annealing the re-sintered body in an atmosphere containing at least 15% by volume of oxygen at a temperature of 1,300° C. to 1,500° C. for at least 10 hours, 7.

The method of preparing the paramagnetic garnet type transparent ceramic material according to 6 wherein the re-sintered body is pressure-sintered again before the oxidative annealing treatment is carried out.

Advantageous Effects of Invention

According to the invention, there is provided a paramagnetic garnet type transparent ceramic material which is a transparent sintered body of paramagnetic garnet composite oxide containing Tb and Al, which has a total light transmittance spectrum that meets predetermined light absorption conditions on the wavelength side longer than 900 nm, based on the total light transmittance at wavelength 900 nm, so that the absorption coefficient at 1,064 nm over the mount length of 24 mm is up to 0.0030 $cm^{-1}$, and which is best suited as the Faraday rotator for high-power application.

BRIEF DESCRIPTION OF DRAWINGS

FIG. 1 is a schematic cross-sectional view of an optical isolator constructed using the inventive paramagnetic garnet type transparent ceramic material as the Faraday rotator.

DESCRIPTION OF EMBODIMENTS

As used herein, the numerical range of "A to B" is inclusive of the endpoints and means a range from A to B.

[Paramagnetic Garnet Type Transparent Ceramic]

The paramagnetic garnet type transparent ceramic material of the invention is described below.

The invention provides a paramagnetic garnet type transparent ceramic material which is a sintered body of Tb-containing rare earth aluminum garnet having the formula (1):

$$(Tb_{1-x-y}Y_xSc_y)_3(Al_{1-z}Sc_z)_5O_{12} \quad (1)$$

wherein $0<x<0.45$, $0<y\leq0.1$, and $0.004<z<0.2$, wherein when a total light transmittance spectrum is determined across an optical path length of 24 mm, the total light transmittance at wavelength 900 nm is a % and the total light transmittance at an arbitrary wavelength λ on the wavelength side longer than 900 nm is b %, the paramagnetic garnet type transparent ceramic material meets $|a-b|\leq 0.1$ at least in the range: 900 nm<λ<1,100 nm.

In the garnet crystal structure represented by formula (1), the site mainly occupied by Tb, that is, the former parentheses in formula (1) is designated A site, and the site mainly occupied by Al that is, the latter parentheses in formula (1) is designated B site.

At A site in formula (1), terbium(Tb) is an element which has the largest Verdet constant among trivalent rare earth ions, exhibits extremely low absorption in the 1,064 nm region (inclusive of wavelength 1,070 nm) used in fiber lasers, and is best suited for use as the optical isolator material in this wavelength region. It is noted that Tb(III) ions are readily oxidized into Tb(IV) ions. It is desirable to exclude Tb(IV) ions as much as possible for the reason that if Tb(IV) ions are generated in metal oxide, then the ions absorb light at wavelengths in a broad range from ultraviolet to near-infrared to reduce the transmittance. One strategy for avoiding the generation of Tb(IV) ions is to adopt the crystal structure where Tb(IV) ions are unstable, that is, garnet structure.

Yttrium (Y) has an ionic radius which is about 2% smaller than that of terbium. When it combines with aluminum to form a composite oxide, it forms the garnet phase more stably than the perovskite phase. Yttrium is thus an element preferably utilized herein.

At B site in formula (1), aluminum (Al) is an element which has the smallest ionic radius among trivalent ions that can exist stable in oxides having the garnet structure and which can minimize the lattice constant of Tb-containing paramagnetic garnet oxides. It is preferable that the lattice constant of garnet structure can be reduced without changing the Tb content, because the Verdet constant per unit length can be increased. Furthermore, aluminum is a light metal, is weakly diamagnetic as compared with gallium, and is expected to exert an effect of relatively enhancing the magnetic flux density created within the interior of the Faraday rotator, which is also preferable because the Verdet constant per unit length can be increased. In fact, the Verdet constant of TAG ceramics is increased to 1.25 to 1.5 times that of TGG. It becomes possible that the Verdet constant per unit length is maintained equal to or slightly below that of TGG, even when the relative concentration of terbium is reduced by substituting yttrium ions for some of terbium ions. Therefore, aluminum is the suitable constituent element in the invention.

In case composite oxides consist of constituent elements Tb, Y and Al, they sometimes do not assume the garnet structure due to minute weighing errors. It is then difficult to produce transparent ceramics useful in the optical application in a consistent manner. The invention aims to eliminate any compositional shifts due to minute weighing errors by adding scandium(Sc) as an additional constituent element. Scandium is an element having an intermediate ionic radius which can form a solid solution on both A and B sites in oxides of the garnet structure. Scandium serves to adjust a distribution ratio between A site (rare earth site consisting of Tb and Y) and B site (aluminum site) so as to coincide with the stoichiometric ratio when a blend ratio of rare earth elements Tb and Y to Al shifts from the stoichiometry due to variations during weighing, and thereby so as to minimize the crystallite creation energy. In this sense, scandium is a buffer material that forms a solid solution on both A site and B site. Also, scandium is an element which can limit the proportion of alumina heterophase to the garnet matrix to 1 ppm or less and the proportion of perovskite heterophase to the garnet matrix to 1 ppm or less. This element is added in order to improve the yield of products.

In formula (I), x is a number in the range: $0<x<0.45$, preferably $0.05\leq x<0.4$, more preferably $0.10\leq x\leq 0.40$, even more preferably $0.20\leq x\leq 0.40$. Ceramics wherein x is in the range have a Verdet constant of at least 30 rad/(T·m) at normal temperature (25° C.) and wavelength 1,064 nm, and so the ceramics can be used as the Faraday rotator. A larger value of x in the range is preferred because of the tendency that the thermal lens effect becomes weaker. Also a larger value of x in the range is preferred because of the tendency that the diffuse transmittance becomes smaller. It is noted that the same stands true to laser light of wavelength 1,070 nm. In contrast, a value of x which is equal to or greater than 0.45 is undesirable because the Verdet constant at wavelength 1,064 nm is less than 30 rad(T·m). Differently stated, if the relative concentration of Th is excessively thinned, the overall length of the Faraday rotator which is necessary to rotate laser light of wavelength 1,064 nm by 45 degrees is expanded beyond 30 mm on use of general magnets, which is undesirable because it is difficult to produce a Faraday rotator of such length.

In formula (1), y is a number in the range: $0<y\leq 0.1$, preferably $0<y<0.1$, more preferably $0<y<0.08$, even more preferably $0.002\leq y\leq 0.07$, most preferably $0.003\leq y\leq 0.06$. A value of y in the range allows the perovskite heterophase to be reduced to an undetectable level by X-ray diffraction (XRD) analysis. A value of y in the range is also preferred in that the number of the perovskite heterophase (in the form of grains having a typical size of 1 to 1.5 μm in diameter and looking as colored light brown) when observed under optical microscope in a visual field of 150 μm×150 μm is 1 or less. At this point of time, the proportion of the perovskite heterophase to the garnet matrix is 1 ppm or less.

When y is more than 0.1, the substitution of Sc for part of Tb takes place in addition to the substitution of Y for part of Tb, which results in an unnecessary lowering of the solid solution concentration of Th and hence, a small Verdet constant, which is undesirable. Also, since Sc is obtained from an expensive raw material, the unnecessary excessive doping of Sc is undesirable in view of manufacturing cost. When y is equal to or more than 0.08, there can be increased the risk that the absorption of antisite defects of Th and Y entering B sites and Al entering A sites occurs.

In formula (1) wherein $0.05\leq x<0.45$ and $0<y<0.1$, the range of 1-x-y is preferably 0.5<1-x-y 0.95, more preferably $0.55\leq 1-x-y<0.95$, even more preferably $0.6\leq 1-x-y<0.95$. A value of 1-x-y in the range ensures a large Verdet constant and high transparency at wavelength 1,064 nm. The same holds true at wavelength 1.070 nm.

In formula (1), z is a number in the range: $0.004<z<0.2$, preferably $0.004<z<0.16$, more preferably $0.01\leq z\leq 0.15$, even more preferably $0.03\leq z\leq 0.15$. When z is in the range, the perovskite heterophase is not detectable by XRD analysis. A value of z in the range is also preferred in that the number of the perovskite heterophase (in the form of grains having a typical size of 1 to 1.5 μm in diameter and looking as colored light brown) when observed under optical microscope in a visual field of 150 μm×150 μm is 1 or less. At this point of time, the proportion of the perovskite heterophase to the garnet matrix is 1 ppm or less.

When z is equal to or more than 0.2, the effect of suppressing the precipitation of perovskite heterophase is saturated or unchanged, a value of y, that is, the proportion of substitution of Sc for T increases in harmony with an increasing value of z, which results in an unnecessary lowering of the solid solution concentration of Th and hence, a small Verdet constant, which is undesirable. Also, since Sc is obtained from an expensive raw material, the unnecessary excessive doping of Sc is undesirable in view of manufacturing cost. When z is equal to or more than 0.16, there can be increased the risk that the absorption of antisite defects of Th and Y entering B sites and Al entering A sites occurs.

It is preferred for the paramagnetic garnet type transparent ceramic material that the sintered body contains a sintering aid. Specifically, the sintered body contains more than 0% by weight to 0.1% by weight (more than 0 ppm to 1,000 ppm) of $SiO_2$ as the sintering aid. If the content exceeds 0.1% by weight (1,000 ppm), there is a risk that the excess of Si creates crystal defects which cause a minor amount of light absorption.

When the paramagnetic garnet type transparent ceramic material of the invention is determined for a total light transmittance spectrum across an optical path length of 24 mm, the paramagnetic garnet type transparent ceramic material should meet $|a-b|\leq 0.1$ at least in the range: 900 nm<λ<1,100 n wherein the total light transmittance at wavelength 900 nm is a % and the total light transmittance at an arbitrary wavelength λ on the wavelength side longer than 900 nm is b %. Preferably, $|a-b|\leq 0.1$ remains always valid in the range: 900 nm<λ<1,100 nm, and the minimum (or shortest) wavelength λ1 on the wavelength side longer than 900 nm which meets $|a-b|>0.1$ is 1,100 nm or longer. This means that the ceramic material has such a spectral configuration that provided that the total light transmittance at wavelength 900 nm across a mount length of 24 mm is the reference (a %), the wavelength at which the absolute value ($|a-b|$) of the difference between the reference and the total light transmittance (b %) on the wavelength side longer than 900 nm exceeds 0.1% for the first time is 1,100 nm or longer.

When the paramagnetic garnet type transparent ceramic material of the invention is used in a Faraday rotator, it is necessary that the ceramic material absorbs laser light as little as possible to suppress the development of a thermal lens effect.

The factors which are considered to cause transparent ceramics to absorb light include oxygen deficits resulting from high-temperature sintering and cation defects associated with crystal distortion due to transparentization of a sintered body at high temperature and pressure. When Y is added, outstanding oxygen deficits are developed to bring about broad absorption centering the wavelength band 750-900 nm, so that the sintered body turns black on outer appearance. This absorption tails to the service wavelength band of 1,000 to 1,100 nm and naturally affects the thermal lens effect. On the other hand, the cation defects tend to arise when the sintered body is transparentized at high temperature and pressure (although the cause is not well understood), resulting in an absorption pattern centering at 900 nm and moderately declining toward short and long wavelength sides. Partly because the absorption amounts on short and long wavelength sides are linearly interlocked, the sintered body turns brown on outer appearance. Since the short wavelength side is outside the service wavelength band of the Faraday rotator, it does not affect the properties of the Faraday rotator, but the absorption occurring from 900 nm toward the long wavelength side naturally affects the thermal lens effect.

It is noted that where there exists the broad absorption of oxygen deficits centering at wavelength 750-900 nm and straddling the near-infrared region, the value of total light transmittance "b" is greater than the value of total light transmittance "a". On the other hand, where the cation defects exist, the value of "a" is greater than the value of "b".

When the arbitrary wavelength at which the absolute value ($|a-b|$) of the difference between "a" and "b" exceeds 0.1% for the first time is shorter than 1,100 nm, in the case of oxygen deficits, there is a strong possibility that they tails from (or are affected by) the broad absorption centering at 750 nm and in the case of cation defects, there is a strong possibility that moderate absorption centering at 900 nm occurs. In either case, a thermal lens effect arises upon input of 100 W laser with wavelength 1.000 to 1,100 nm.

In contrast, when the arbitrary wavelength at which the absolute value ($|a-b|$) of the difference between "a" and "b" exceeds 0.1% for the first time is 1,100 nm or longer, the occurrence of a thermal lens effect upon input of 100 W laser with wavelength 1,000 to 1,100 nm is mitigated. When the wavelength is 1,150 nm or longer, the occurrence of a thermal lens effect is minimized.

Further, the paramagnetic garnet type transparent ceramic material has an absorption coefficient at wavelength 1,064 nm of preferably up to 0.0030 $cm^{-1}$, more preferably up to 0.0015 $cm^{-1}$. The absorption coefficient is a parameter indicative of the degree of light absorption of an optical material. As the value of absorption coefficient becomes smaller, the thermal lens effect can be reduced. For a mount length of 24 mm, in the case of an absorption coefficient of 0.0030 $cm^{-1}$, the thermal lens effect can be suppressed up to a power of 100 W. In the case of an absorption coefficient in excess of 0.0030 $cm^{-1}$, the paramagnetic garnet type transparent ceramic material (Faraday rotator) generates heat upon irradiation of 100 W laser to exert a thermal lens effect.

The absorption coefficient is measured by the following method. That is, an absorption coefficient is determined from a transmittance and computed from the difference between the theoretical transmittance calculated from a refractive index and the total light transmittance measured. The computation method may be in accordance with the following formula (2).

$$\text{absorption coefficient} = -10\times\log_{10}(I/I_0)/L \quad (2)$$

wherein I is the transmittance measured. $I_0$ is the theoretical transmittance, and L is a sample length (cm).

It is noted that the method for measuring the total light transmittance is carried out with reference to JIS K7361-1 (ISO 13468-2:1999) and JIS K7375:2008, for example, by the double beam method or the single beam method using a commercial UV/Vis spectrophotometer, or by transmission loss measurement using laser light.

When the paramagnetic garnet type transparent ceramic material without an antireflective coating is measured for total light transmittance across mount length 24 mm, the total light transmittance at wavelength 900 nm is preferably from 84% to 85%. At this point of time, the wavelength at which the absolute value ($|a-b|$) of the difference between the total light transmittance (a %) at wavelength 900 nm and the total light transmittance (b %) at an arbitrary wavelength on the wavelength side longer than 900 nm exceeds 0.1% for the first time is preferably 1,100 nm or longer, more preferably 1,150 nm or longer.

When laser light at wavelength 1,064 m across optical path length 24 mm enters at a beam diameter of 1.6 mm and an incident power of 100 W, the paramagnetic garnet type transparent ceramic material experiences a percent variation of focal length due to the thermal lens effect which is preferably less than 10%, more preferably up to 9%, even more preferably up to 8%, further more preferably up to 7%.

When the percent variation of focal length due to the thermal lens effect under a certain incident power is less than 10%, system mounting at that incident power is possible, that is, the thermal lens performance is regarded passed. Since the paramagnetic garnet type transparent ceramic material can manage the percent variation of focal length due to the thermal lens effect upon entry of 100 W high-power laser to less than 10%, the material can be substantially employed in 100 W high-power laser systems.

Since the paramagnetic garnet type transparent ceramic material constructed as above is effective for suppressing the occurrence of a thermal lens effect upon entry of high-power laser, it can be used as the Faraday rotator for fiber lasers with a high power of 100 W or greater.

[Method of Preparing Paramagnetic Garnet Type Transparent Ceramic Material]

Another embodiment of the invention is a method of preparing the paramagnetic garnet type transparent ceramic material defined above, comprising the steps of:

pressure-sintering a sintered body of a Tb-containing rare earth aluminum garnet having the formula (1):

$$(Tb_{1-x-y}Y_xSc_y)_3(Al_{1-z}Sc_z)_5O_{12} \quad (1)$$

wherein 0<x<0.45, 0<y S 0.1, and 0.004<z<0.2, heating the pressure-sintered body at a temperature higher than the pressure-sintering temperature for re-sintering, and oxidatively annealing the re-sintered body in an atmosphere containing at least 15% by volume of oxygen at a temperature of 1,300° C. to 1,500° C. for at least 10 hours.

Herein, the paramagnetic garnet type transparent ceramic material is prepared by the following procedure.

(Source Powder for Sintering) First, a source powder for sintering corresponding to the garnet composite oxide composition having formula (1) is prepared.

(Starting Raw Material Mixed Powder)

Although the method of preparing the source powder for sintering used herein is not particularly limited, the source powder for sintering may be obtained by using powdered oxides of constitutional elements corresponding to the garnet type composite oxide as starting materials, weighing predetermined amounts thereof so as to reach the composition corresponding to formula (1), and mixing them, or by synthesizing an oxide powder of uniformly distributed components. The latter method of synthesizing an oxide powder of uniformly distributed components is exemplified by co-precipitation, complex polymerization or uniform settling and is not particularly limited as long as transparentization is possible. The powder is herein referred to as starting raw material mixed powder. The starting raw materials are not particularly limited as long as transparentization is possible. From the aspect of restraining absorption attributable to impurities, their purity is preferably at least 99.9% by weight, more preferably at least 99.99% by weight, most preferably at least 99.999% by weight. Although the primary particle size of the source powder is not particularly limited as long as transparentization is possible, the primary particle size is preferably from 50 nm to 1,000 nm as viewed from ease of sintering. The shape of primary particles is selected from card house, sphere and rod shapes although the shape is not particularly limited as long as transparentization is possible.

(Garnet Type Composite Oxide Powder)

Alternatively, the method of preparing the source powder for sintering used herein may use any of co-precipitation, crushing, spray thermal decomposition, sol-gel, alkoxide hydrolysis, and other synthesis means. In some cases, the resulting ceramic raw material of rare earth composite oxide may be treated on a wet ball mill, bead mill, jet mill, dry jet mill, hammer mill or the like until the desired particle size is reached. For example, the source powder for sintering may be obtained by the solid phase reaction method of mixing a plurality of particulate oxides and firing the mix to achieve uniformity through thermal diffusion of ions, or the co-precipitation method of dissolving oxide particles to form an ion-containing solution, causing hydroxides, carbonates or the like to precipitate from the solution, firing the precipitate into oxide to achieve uniformity.

In the case of the solid phase reaction method of mixing a plurality of particulate oxides and firing the mix to achieve uniformity through thermal diffusion of ions, the starting raw materials which can be preferably utilized include metal powders of terbium, yttrium, scandium and aluminum, or the metal powders which are dissolved in aqueous solution of nitric acid, sulfuric acid or uric acid, or oxide powders of the foregoing elements. The starting materials should preferably have a purity of at least 99.9% by weight, more preferably 99.99% by weight. A powder obtained by weighing the predetermined amounts of starting raw materials so as to reach the composition corresponding to formula (1), mixing them, firing the mixture into a fired mixture composed mainly of cubic garnet type oxide of desired construction, and grinding the fired mixture may be used as the source powder for sintering (garnet type composite oxide powder). In this procedure, the firing temperature is preferably equal to or above 950° C. and below the subsequent sintering temperature, more preferably equal to or above 1,100° C. and below the subsequent sintering temperature. The firing time may be at least 1 hour, during which the heating rate is preferably from 100° C./h to 500° C./h. The firing atmosphere is preferably an oxygen-containing atmosphere such as air or oxygen, whereas nitrogen atmosphere, argon atmosphere and hydrogen atmosphere are inadequate. The firing unit is not particularly limited as long as the desired temperature is reached and oxygen flow is possible, and suitable firing units include a vertical muffle furnace, lateral tubular furnace, rotary kiln and the like. As used herein, the term "composed mainly of" means that a main peak obtained from the results of powder X-ray diffractometry of the fired mixture is the diffraction peak assigned to the garnet structure. It is noted that when the proportion of perovskite heterophase to the garnet matrix is 1 ppm or less, substantially only a garnet single-phase pattern is detected as the powder X-ray diffraction pattern.

The source powder for sintering preferably contains a sintering aid. For example, the source powder for sintering may be obtained by adding tetraethoxysilane (TEOS) as the sintering aid to the starting raw materials in an amount of more than 0 ppm to 1,000 ppm (more than 0% by weight to 0.1% by weight), calculated as $SiO_2$, of the overall source powder (starting raw material mixed powder or garnet type composite oxide powder+sintering aid), or adding $SiO_2$ powder in an amount of more than 0 ppm to 1.000 ppm (more than 0% by weight to 0.1% by weight) of the overall source powder (garnet type composite oxide powder+sintering aid), mixing and firing if necessary (to form garnet type composite oxide powder). If the addition amount is in excess of 1,000 ppm, there is a risk that the excess of Si creates crystal defects which cause a minor amount of light absorption. The purity is preferably at least 99.9% by weight. The sintering aid may be added during preparation of the source powder slurry. When the sintering aid is not added, the source powder for sintering (i.e., starting raw material mixed powder or composite oxide powder) consisting of primary particles with a particle size of nanometer order and having a very high sintering activity may be selected. Such selection is optional.

(in Case of Starting Raw Material Mixed Powder)

Since the starting raw material mixed powder (mixture of powdered oxides or oxide powder of uniformly distributed components) is in agglomerated state, it must be dispersed down to primary particles. To this end, wet dispersion may be performed for shiny formation. The wet dispersion is not particularly limited as long as dispersion to primary particles is possible. Suitable wet dispersion units include a ball mill, bead mill, jet mill and homogenizer. The solvent for wet dispersion is not particularly limited as long as transparentization is possible and solid-liquid separation is easy. Examples of the solvent include pure water, alcohols, typically lower alcohols of 1 to 4 carbon atoms, and acetone. An organic additive (dispersing agent) may be used to disintegrate the agglomerated state. Exemplary additives include polyethylene glycol, polyacrylic ether, phosphoric acid, and sulfonic acid-based dispersing agents. Of these, polyethylene glycol and polyacrylic ether-based dispersing agents are preferred because they can be readily removed by heat treatment and residues are less.

(in Case of Garnet Type Composite Oxide Powder)

The fired raw material is ground into the source powder for sintering. Any of dry and wet grinding techniques may be selected while it is necessary to grind the raw material such that the desired ceramic material may become highly transparent. In the case of wet grinding, for example, the fired raw material is ground and dispersed in slurry form to primary particles by various grinding (dispersing) means such as ball mill, bead mill, homogenizer, jet mill or ultrasonic application. The dispersing medium used for the wet slurry is not particularly limited as long as the final ceramic material can be processed highly transparent, and may be selected from pure water and alcohols, typically lower alcohols of 1 to 4 carbon atoms. Sometimes various organic additives may be added to the wet slurry for the purpose of improving the quality stability and yield in the subsequent ceramic producing process. In the practice of the invention, the foregoing items are not particularly limited. That is, various dispersing agents, binders, lubricants, and plasticizers may be advantageously utilized. Of the organic additives, it is preferred to select an additive of high purity grade free of unnecessary metal ions.

[Producing Process]

According to the invention, the slurry containing the source powder for sintering is formed to a predetermined shape, burnout is performed, then pre-sintering is performed to form a sintered body (pre-sintered body) of composite oxide having a relative density of at least 93% and an average sintered grain size of up to 5 μm. Subsequently, the sintered body is pressure-sintered, the pressure-sintered body is heated above the pressure-sintering temperature for re-sintering. The re-sintered body is pressure-sintered again, if necessary. Further, the re-sintered body (or re-pressure-sintered body) is subjected to predetermined oxidative annealing treatment.

(Forming)

The slurry is subjected to solid-liquid separation and formed into the predetermined shape. The forming technique, which is generally divided into dry forming and wet forming, is not particularly limited as long as the predetermined shape is consistently obtained. In the case of dry forming, a procedure including the steps of spray drying the slurry into granules, filling a jig with the granules, and press forming is exemplary. In the case of wet forming, a cast shaping procedure including the steps of casting the slurry into a gypsum mold and letting the solvent volatilize. Other exemplary procedures include extrusion molding, sheet forming, centrifugal casting, and cold isostatic pressing. The forming procedure is not particularly limited because the predetermined shape is obtained from any of these procedures.

Prior to the forming, a binder may be added to the slurry. The binder is effective for enhancing the retaining force of a formed body and substantially preventing the body from cracking and fissure. Although the type of binder is not particularly limited, a binder which is compatible with the solvent and leaves little residues after heat treatment is preferred. Exemplary binders include polyvinyl alcohol, polyvinyl butyral, polyvinyl acetate, and polyacrylic acid while a polymer obtained from copolymerization of two or more of these binders may also be used. The amount of the binder varies with the forming method or binder type. An amount of 0.5% by weight based on the source powder for sintering is necessary at the minimum while the upper limit is 8% by weight. Most preferably, the binder is added during wet grinding.

For the press forming, any standard pressing procedures may be advantageously utilized. Namely, most general procedures may be advantageously utilized, for example, uniaxial pressing procedure of charging a mold with the powder and pressing in one direction, cold isostatic pressing (CIP) procedure of placing the powder in a deformable waterproof vessel in a sealed manner and pressing under isostatic pressure, and warm isostatic pressing (WIP) procedure. The applied pressure may be adjusted as appropriate while monitoring the relative density of the formed body. Although the pressure is not particularly limited, it is recommended to manage the pressure in the range of about 300 MPa or lower which can be handled by commercial CIP or WIP system because the production cost can be reduced.

Notably, for the purpose of controlling the size and amount of scattering sources such as foreign particles and stains to the specified range, it is preferred to use a clean special forming jig or forming unit which has been fully cleaned and dried, and to select a clean space having class 1000 or lower as the environment where forming operation is carried out.

(Burnout)

Since the formed body contains organic additives such as binder and dispersing agent, the burnout step of heat treatment to decompose the organic matter is carried out. While the burnout temperature may be equal to or above the temperature at which the organic additives are decomposed, a temperature of from 270° C. to 1,200° C. in an atmosphere containing air, oxygen or hydrogen, preferably ambient air is preferred. At a temperature below 270° C., there is a risk that the organic matter is not fully burnt out, leaving carbon. At a temperature above 1,200° C., the formed body is excessively densified so that the subsequent sintering step is exacerbated in sinterability. To confirm the complete combustion of organic matter, the formed body after burnout is analyzed by thermogravimetric and differential thermal analyses (TG/DTA) to ascertain the disappearance of a weight loss and an exothermic peak associated with combustion of organic matter.

(Sintering Step)

The burnout formed body is turned transparent by the sintering step. The sintering step may be single sintering to achieve transparentization (so as to reach relative density 100%) or first sintering (pre-sintering) to reach a relative density of at least 93% and pressure-sintering (hot isostatic pressing (HIP)) to achieve transparentization. The sequence of pre-sintering and pressure-sintering is preferred for producing a transparent body in high yields.

(Pre-Sintering)

This step is to form a pre-sintered body which is densified to a relative density of at least 93%, and preferably has an average sintered grain size of up to 5 μm. The conditions of this step including temperature and holding time must be adjusted such that the sintered grain size falls in the desired range.

In the embodiment wherein the sintered body is made transparent through two stages of pre-sintering and pressure-sintering (HIP), the relative density after pre-sintering is preferably at least 93%, more preferably at least 94%, even more preferably at least 95%. With a relative density of less than 93%, often the interior and the exterior of the formed body are interconnected by bubbles (open bubbles), and the body is difficult to be transparentized even by the subsequent pressure-sintering (HIP). The upper limit of relative density is not particularly limited as long as bubbles are removed by pressure-sintering.

The pre-sintered body after pre-sintering should preferably have an average sintered gain size of up to 5 μm, more preferably up to 3 μm, even more preferably up to 2.5 μm. The average grain size of sintered grains can be adjusted by a proper combination of raw material species, atmosphere, sintering temperature and holding time. If the sintered grain size is larger than 5 μm, the subsequent pressure-sintering (HIP) is unlikely to incur plastic deformation, with the risk of disturbing removal of bubbles remaining in the pre-sintered body. The lower limit of sintered grain size is not particularly limited as long as a sintered density of at least 93% is obtained.

The average grain size of sintered grains (average sintered grain size) is determined by measuring the diameter of sintered grains in the relevant sintered body under a metallographical microscope. Specifically, the average sintered grain size is determined as follows.

Namely, the pre-sintered body is observed under a metallographical microscope using an objective lens with magnification ×50 in the reflection mode, with a reflection image being taken on the sintered body surface. Specifically, an image is taken on the overall region of the optical effective area of the relevant sintered body in consideration of the effective image size of the objective lens, and analysis is carried out on the image thus taken. At this point of time, a diagonal line is drawn on the taken image, the total number of sintered grains traversed by the diagonal line is counted, and the length of the diagonal line divided by the total count number is defined as the average grain size of sintered grains in the image. The average grain sizes on taken images read out on analysis operations are summed, and the sum divided by the number of taken images is defined as the average sintered grain size of the sintered body (the same holds true in Examples below).

Herein, the ordinary sintering step is advantageously utilized. That is, the heat sintering step of resistance heating, induction heating or another heating mode is advantageously utilized. The atmosphere used herein is not particularly limited and various atmospheres such as ambient air, inert gas, oxygen gas, hydrogen gas and helium gas are applicable. Sintering under reduced pressure or vacuum is preferably utilized from the aspect of removing bubbles. The pre-sintering is preferably under a vacuum of up to $1\times10^{-1}$ Pa, more preferably up to $1\times10^{-2}$ Pa, even more preferably up to $1\times10^{-3}$ Pa.

In the pre-sintering step, the sintering temperature is preferably 1,450 to 1,650° C., more preferably 1,500 to 1,600° C. A sintering temperature in the range is preferred in that densification is promoted while suppressing heterophase precipitation and grain growth. In the pre-sintering step, the holding time of the order of several hours is sufficient for sintering, but must be such that the pre-sintered body is densified to a relative density of at least 94%.

(Pressure-Sintering (Hot Isostatic Pressing (HIP)))

In the preparation method of the invention, the pre-sintering body after the pre-sintering step is subjected to pressure-sintering (or HIP treatment) preferably under a pressure of from 50 MPa to 300 MPa and at a temperature of from 1,000° C. to 1,780° C. Notably, the species of the pressure gas medium used herein may be selected from inert gases such as argon and nitrogen, and Ar—$O_2$, with argon being most preferred. The pressure applied by the pressure gas medium is preferably 50 to 300 MPa, more preferably 100 to 200 MPa. A pressure below 50 MPa may fail to achieve a transparency-enhancing effect whereas increasing the pressure beyond 300 MPa fails to achieve further transparency improvement and causes excessive loads to the system, with the risk of damaging the system. An applied pressure of up to 196 MPa is convenient and preferable because a commercial HIP system can be operated to apply such pressure. The treating temperature (holding temperature) is preferably set in the range of 1,000 to 1,780° C. more preferably 1,100 to 1,700° C., and most preferably in the range of the pre-sintering temperature ±100° C. A heat treatment temperature above 1,780° C. is undesirable because grain growth takes place during HIP treatment to retard the removal of bubbles. A heat treatment temperature below 1,000° C. may cause a substantial failure to exert the effect of improving the transparency of a sintered body. Although the holding time at the heat treatment temperature is not particularly limited, a too long holding time is undesirable because the risk of generating oxygen deficits increases. The holding time is typically set in the range of 1 to 3 hours. Although the heater material, thermal insulating material and treating vessel for HIP treatment are not particularly limited, graphite, molybdenum, tungsten or platinum (Pt) is advantageously utilized. Also, yttrium oxide and gadolinium oxide may be advantageously utilized for the treating vessel. When the treatment temperature is 1,500° C. or higher, graphite is preferably used as the heater material and thermal insulating material. In this embodiment, the treating vessel is selected from graphite, molybdenum and tungsten, and lined with an inner liner selected from yttrium oxide and gadolinium oxide to construct a double-wall vessel. The vessel is preferably charged with an oxygen release agent because the amount of oxygen deficits generated during the HIP treatment can be minimized.

(Re-Sintering)

The preparation method of the invention involves, after the pressure-sintering (HIP) step, the step of heating the pressure-sintered body at a temperature beyond the pressure-sintering temperature, for re-sintering and grain growth to produce a re-sintered body having an average sintered grain size of at least 10 μm. The conditions of this step including temperature and holding time must be elaborately set such that the final sintered grain size may fall in the desired range.

Although the type of atmosphere gas used herein is not particularly limited, air, oxygen or hydrogen is preferably used. Treatment under reduced pressure (vacuum of lower than $1\times10^{-2}$ Pa) is more preferred. The re-sintering temperature is preferably from 1,650° C., to 1,800° C., more preferably from 1,700° C. to 1,800° C. A temperature below 1,650° C. is undesirable because grain growth does not take place. The sintered grains after re-sintering have an average grain size of preferably at least 10 μm, more preferably at least 15 μm, even more preferably at least 20 μm, and preferably up to 40 μm. Although the holding time of the re-sintering step is not particularly limited, the holding time is preferably at least 5 hours, more preferably at least 10 hours. In general, the longer the holding time is extended, the more grain growth in the sintered body is accelerated. The temperature and holding time of the re-sintering step may be adjusted as appropriate while monitoring the average sintered grain size.

The average grain size of sintered grains in the re-sintered body (average sintered grain size) is determined by measuring the diameter of sintered grains in the relevant re-sintered body under a metallographical microscope. Specifically, the average grain size is determined as follows. Namely, the re-sintered body is observed under a metallographical microscope using an objective lens with magnification ×50 in the transmission mode, with a transmission open Nicol image being taken on a sintered body sample having end surfaces polished. Specifically, an image is taken on the optical effective region of the relevant sintered body at the predetermined depth. A diagonal line is drawn on the taken image, the total number of sintered grains traversed by the diagonal line is counted, and the length of the diagonal line divided by the total count number is defined as the average sintered grain size of sintered grains in the image. The average grain sizes on taken images read out on analysis operations are summed, and the sum divided by the number of taken images is defined as the average sintered grain size of the relevant sintered body (the same holds true to the average sintered grain size in the re-HIP body and in Examples below).

(Re-Pressure-Sintering (Re-HIP))

The re-sintered body may be subjected to pressure-sintering again prior to oxidative annealing treatment and followed by oxidative annealing treatment. Namely, to enhance the uniformity of the transparent sintered body thus obtained, the re-sintered body is preferably subjected to re-pressure-sintering (re-HIP treatment) under the same conditions as in the previous pressure-sintering (HIP) step until the average sintered grain size reaches 40 μm or less. An average sintered grain size in excess of 40 μm is undesirable because of a likelihood of particle removal from the ceramics. Therefore, the re-sintering temperature is set such that the target grain size may be reached and similarly, the re-pressure-sintering (re-HIP) temperature is set such that a highly transparent body may be obtained. With the aim of enlarging crystal grains (sintered grains), it is rather undesirable, as mentioned above, to enlarge crystal grains immediately by pre-sintering. It is most desirable to enlarge crystal grains in two stages.

(Oxidative Annealing)

The oxidative annealing treatment is the critical step in the inventive method. The paramagnetic garnet type transparent ceramic material having undergone the foregoing treatments is colored due to the inclusion of oxygen deficits and/or cation defects. The oxidative annealing treatment is performed to remove the color.

The oxidative annealing treatment is to heat in an atmosphere containing at least 15% by volume of oxygen at a temperature of from 1,300° C. to 1,500° C. for a time of at least 10 hours, preferably to heat in an atmosphere containing at least 15% by volume of oxygen at a temperature of from 1,300° C. to 1,500° C. for a time of at least 20 hours. The oxidative annealing treatment may also be to heat in an atmosphere containing at least 15% by volume of oxygen at a temperature of from 1,300° C. to lower than 1,400° C. for a time of at least 40 hours.

The treating atmosphere having an oxygen content of less than 15% by volume is inadequate because there is not available a sufficient amount of oxygen to recover oxygen deficits. A treating temperature below 1,300° C. is inadequate because oxygen cannot be diffused into the sintered body (ceramic material). A treating temperature in excess of 1,500° C. is inadequate because once-hidden or collapsed bubbles are re-expanded by pressure-sintering (HIP) to become an optical scattering source. A treating time of less than 10 hours is inadequate because oxygen cannot be diffused into the sintered body (ceramic material). Although the upper limit of the treating time is not critical, the treating time may be set sufficient for decoloring because an extraordinarily long time is not cost effective. Since the sintered body (ceramic material) to be treated is intended for use as the Faraday rotator in high-power laser machines (fiber lasers), the sintered body is of a cylinder shape having a diameter of 4 to 10 mm or a prism shape having one side of 4 to 10 nm.

Although there is known the technique of estimating the amount of oxygen deficits through the acknowledgement that the density of a transparent sintered body is substantially the same as the true density, this technique of estimating the amount of oxygen deficits is inadequate in the practice of the invention. The reason is that in general, the term "substantially the same density" indicates a difference of less than 0.1%, but a difference in oxygen deficit amount can be borne even within less than 0.1%, with a possibility of absorption remaining. Therefore, rather than estimating the amount of oxygen deficits from the density, the invention determines or prescribes the amount of oxygen deficits in the paramagnetic garnet type transparent sintered body from the profile of the total light transmission spectrum of the transparent sintered body, more specifically the profile of the total light transmission spectrum at wavelength 900 nm and longer wavelength side.

By subjecting the formed body to (pre-sintering)-(pressure sintering)-(re-sintering) or (pre-sintering)-(pressure sintering)-(re-sintering)-(re-pressure-sintering) under the predetermined conditions and subsequently, to oxidative annealing treatment, there is obtained a paramagnetic garnet type transparent ceramic material, specifically a paramagnetic garnet type transparent ceramic material which meets $|a-b|\leq0.1$ at least in the range: 900 nm<λ<1,100 nm, provided that when a total light transmittance spectrum is determined across an optical path length of 24 mm, the total light transmittance at wavelength 900 nm is a % and the total light transmittance at an arbitrary wavelength h on the wavelength side longer than 900 nm is b %.

(Optical Polishing)

According to the preparation method of the invention, the paramagnetic garnet type transparent ceramic material after the series of steps is preferably of a cylindrical or prism shape. Preferably, both the opposed end surfaces on an axis of optical utilization (optical end surfaces) are finished by optical polishing. Herein, the optical surface accuracy as measured at wavelength λ=633 nm is preferably equal to or less than λ/2, more preferably equal to or less than λ/8. To this end, polishing finish treatment is preferably performed at the final stage of optical polishing step. Also, the surface accuracy (reflection wave surface accuracy) is preferably equal to or less than 0.16 μm as the (P-V) value. Then, the ceramic develops a colorless transparent outer appearance in the direction of an axis of optical utilization.

It is possible that an antireflective coating (ARC) is deposited on the optically polished surface to further reduce the optical loss. Herein, chemical treatment must be performed prior to the ARC treatment so as not to leave any contaminants on the optical end surfaces. Exemplary chemicals include solutions of acids, bases, and surfactants and organic solvents such as acetone. The chemical liquid is not particularly limited as long as contaminants are fully removed without eroding the optical end surfaces. Also acceptable is a method including carefully wiping or washing the optical surface for cleanness and inspecting the cleanness under a microscope or stereomicroscope. In the case of wipe cleaning, a handling tool made of soft material and a wiping tool of low dusting are preferably selected so that the wipe cleaning step may not cause flaws or smear stains to the optical surface.

[Magneto-Optical Device]

Since the paramagnetic garnet type transparent ceramic material is contemplated for use as the magneto-optical material, it is preferably utilized to construct a magneto-optical device by applying a magnetic field to the paramagnetic garnet type transparent ceramic material parallel to its optical axis, and setting a polarizer and an analyzer with their optical axes shifted by 45 degrees. That is, the paramagnetic garnet type transparent ceramic material is best suited in the magneto-optical device application, and especially advantageously used as a Faraday rotator in an optical isolator of wavelength 0.9 to 1.1 μm.

FIG. 1 is a schematic cross-sectional view of one exemplary optical isolator having a Faraday rotator composed of the inventive magneto-optical material as an optical component.

In FIG. 1, an optical isolator 100 includes a Faraday rotator 110 composed of the paramagnetic garnet type transparent ceramic material, and a polarizer 120 and an analyzer 130 made of polarizing material, which are disposed ahead and aft of the Faraday rotator. In optical isolator 100, polarizer 120, Faraday rotator 110 and analyzer 130 are arranged in the described order. Preferably, a magnet 140 is rested on at least one surface of their side surfaces.

The optical isolator 100 may be advantageously utilized in industrial fiber laser machines. That is, the isolator is effective for preventing the reflected light of laser light emitted by a laser light source from returning to the light source to cause unstable oscillation.

EXAMPLES

Examples and Comparative Examples are given below for further illustrating the invention, but the invention is not limited thereto.

Example 1

Terbium oxide and yttrium oxide (purity 99.999%. Shin-Etsu Chemical Co., Ltd.), aluminum oxide (purity 99.999%, Nippon Light Metal Co., Ltd.), and scandium oxide (purity 99.9%, Shin-Etsu Chemical Co., Ltd.) were placed in a resin pot. The pot was further charged with ethanol (Kanto Chemical Co.), PEG200 (Kanto Chemical Co.) as dispersant, polyvinyl alcohol (Kanto Chemical Co.) as binder. TEOS as sintering aid (in an amount of 1,000 ppm calculated as $SiO_2$, based on the overall source powder, i.e., total of starting raw material mixed powder and sintering aid), and alumina balls (purity 99.9%, Nikkato Corp.) as grinding media. With the pot closed, ball milling was carried out. A rotational speed of 200 rpm was set. The above-mentioned raw materials were used and adjusted in mixing ratio so as to reach the final composition shown in Table 1.

After ball milling, the slurry was granulated through a spray dryer, followed by uniaxial pressing and subsequent CIP forming. There was obtained a formed body of diameter 10 mm by length 40 mm having a relative density of 54%. Burnout treatment was carried out at 1,000° C. for the purpose of removing the binder and other organic matter from within the formed body.

Subsequently, the burnout formed body was placed in a vacuum sintering furnace where pre-sintering was carried out under conditions: vacuum $1\times10^{-3}$ Pa, 1,600° C. and 2 hours. At this point, an average sintered grain size of about 2 μm was measured. Subsequently, pressure-sintering (HIP) treatment was carried out under conditions: applied Ar pressure 198 MPa, 1,600° C. and 3 hours for enhancing transparency. The resulting transparent pressure-sintered body was re-sintered under conditions: vacuum $1\times10^{-3}$ Pa, 1,700° C. and 2 hours. Successively, re-pressure-sintering (re-HIP) treatment was carried out under conditions: applied Ar pressure 198 MPa, 1,600° C. and 3 hours. At this point, an average sintered grain size of 20 μm was measured.

Next, since the resulting transparent body (re-pressure-sintered body) contained absorption sources such as oxygen deficits, oxidative annealing treatment was carried out in air atmosphere while changing temperature and time in the range of 1,200 to 1,550° C. and 5 to 100 hours. For the samples excluding Comparative Examples 1 to 4 having undergone no oxidative annealing treatment, the difference between true density and measured density was less than 0.1%.

The resulting transparent sintered body (oxidative annealed body) was machined and polished to diameter 5 mm by length 24 mm. The opposed end surfaces were subjected to optical polishing such that the accuracy of optical surface was at least λ/8 wherein λ=633 nm. It is noted that in Comparative Examples 1 to 4, since the re-pressure-sintered body was subjected to such treatments without oxidative annealing treatment, the difference between true density and measured density was 0.2%.

The samples thus obtained were analyzed as follows.

<Total Light Transmittance @900 nm>

A sample was measured for a total light transmittance "a" at wavelength 900 nm with reference to JIS K7361-1:1997. Specifically, an integrating sphere was provided with inlet and outlet openings through which light is transmitted and the sample was placed at the inlet opening. A reflecting plate was attached at the outlet opening so that the light emitted from the sample might be all detected by the integrating sphere. From a ratio of the intensity of emergent light detected to the intensity of incident light to the sample, the total light transmittance "a" at wavelength 900 nm was determined. The instrument used herein was spectrophotometer model V-700 by JASCO Corp. Measurement was carried out using the integrating sphere attached thereto. A pinhole was installed so that the light irradiated might have a spot diameter of 3 mm.

Similarly measured are the total light transmittance at wavelength 1,064 nm and the total light transmittance "b" at each wavelength when wavelength λ is varied from wavelength 900 nm toward a longer wavelength side to 1,350 nm by an increment of 1 nm.

<Absorption Coefficient @1,064 nm>

An absorption coefficient was computed according to the above formula (2) using the theoretical transmittance at wavelength 1,064 nm, obtained from the refractive index measurement described below, and the measured total light transmittance at wavelength 1,064 nm, obtained from the total light transmittance measurement described above. When the S/N ratio during the total light transmittance measurement was poor, an average was calculated from the values of forward and backward 10 nm for smoothing (that is, the average of total light transmittance measurements at wavelength 1,054 to 1.074 nm was adopted).

(Measurement of Refractive Index)

The wavelength dependence of refractive index was measured using a prism coupler Model 2010/M by Metricon Corp. There were used a prism having a refractive index approximate to the refractive index of a test sample, and lasers of wavelength 633 nm, 828 nm and 1,550 m as the light source. Using the refractive index at each wavelength, the wavelength dependence of refractive index was determined from Cauchy's dispersion formula. The wavelength dependence of reflectance was then determined, from which a theoretical transmittance at wavelength 1.064 nm was computed.

<Minimum Wavelength λ1 Meeting |a−b|>0.1>

The absolute value |a−b| of the difference between the total light transmittance "a" at wavelength 900 nm and the total light transmittance "b" at each wavelength on the longer wavelength side than 900 un as measured above was determined. The minimum wavelength λ1 meeting |a−b|>0.1 on the longer wavelength side than 900 m was determined.

<Verdet Constant>

The optically polished sample was coated with an anti-reflective coating (ARC) designed to have a center wavelength of 1,064 nm.

As shown in FIG. 1, each sample having ARC coated thereon was inserted into the center bore of a neodymium-iron-boron magnet with an outer diameter of 32 mm, an inner diameter of 6 mm, and a length of 40 mm. Polarizers were inserted at both ends of the magnet. Thereafter, by using a high-power laser (beam diameter 1.6 nm) manufactured by IPG Photonics Corp., and letting a high-power laser beam of wavelength 1,064 nm enter from the both end surfaces, a Faraday rotation angle θ was determined. The Faraday rotation angle θ is defined as the angle which gives the maximum transmittance when the polarizer on the output side is rotated. A Verdet constant was determined according to the following equation. It is noted that the magnitude (H) of a magnetic field applied to the sample was calculated by simulation based on the dimensions of the measurement system, a residual magnetic flux density (Br), and coercivity (Hc).

$$\theta = V \times H \times L$$

Herein θ is a Faraday rotation angle (rad). V is a Verdet constant (rad/(T·m)), H is the magnitude (T) of a magnetic field, and L is the length of the Faraday rotator (0.024 m in this example).

<Variation of Focal Length by Thermal Lens>

A CW laser (wavelength 1,070 nm, beam diameter 1.6 mm, maximum power 100 W) manufactured by IPG Photonics Corp. was operated at a power of 100 W to emit a laser beam. Its laser profile was evaluated by a beam propagation analyzer ModeMaster (Coherent). Provided that $f_0$ is a laser focal position when a laser beam of 100 W was irradiated, but no sample placed, and f is a laser focal position when the ARC-coated sample is placed there, $|f_0-f/f_0 \times 100$ is computed as a percent variation of focal length by thermal lens.

The results of evaluation are shown in Table 1. The theoretical transmittance corresponding to the composition shown in Table 1 was 84.70%.

TABLE 1

| | Composition | Oxidative annealing treatment Temp. (° C.) | Time (h) | Atmosphere | Results: Total light transmittance @ 900 nm (%) | Absorption Coeficient @ 1,064 nm (cm$^{-1}$) | Minimum wavelength meeting \|a b\| >0.1 λ1 (nm) | Variation of focal length by thermal lens (%) | Remarks |
|---|---|---|---|---|---|---|---|---|---|
| Example 1-1 | $(Tb_{0.64}Y_{0.34}Sc_{0.02})_3(Al_{0.98}Sc_{0.02})_5O_{12}$ | 1,300 | 50 | air | 84.57 | 0.0028 | 1,120 | 9 | |
| Example 1-2 | $(Tb_{0.64}Y_{0.34}Sc_{0.02})_3(Al_{0.98}Sc_{0.02})_5O_{12}$ | 1,400 | 40 | air | 84.59 | 0.0024 | 1,180 | 6 | |
| Example 1-3 | $(Tb_{0.64}Y_{0.34}Sc_{0.02})_3(Al_{0.98}Sc_{0.02})_5O_{12}$ | 1,450 | 40 | air | 84.63 | 0.0015 | 1,210 | 4 | |
| Example 1-4 | $(Tb_{0.64}Y_{0.34}Sc_{0.02})_3(Al_{0.98}Sc_{0.02})_5O_{12}$ | 1,450 | 20 | air | 84.61 | 0.0019 | 1,210 | 4 | |
| Example 1-5 | $(Tb_{0.64}Y_{0.34}Sc_{0.02})_3(Al_{0.98}Sc_{0.02})_5O_{12}$ | 1,500 | 20 | air | 84.65 | 0.0011 | 1,210 | 3 | |
| Comp. Ex 1-1 | $(Tb_{0.64}Y_{0.34}Sc_{0.02})_3(Al_{0.98}Sc_{0.02})_5O_{12}$ | 1,200 | 100 | air | 84.10 | 0.0129 | 1,050 | 18 | |
| Comp. Ex. 1-2 | $(Tb_{0.64}Y_{0.34}Sc_{0.02})_3(Al_{0.98}Sc_{0.02})_5O_{12}$ | 1,550 | 20 | air | 84.65 | 0.0011 | 1,210 | 3 | substantial scattering of bubbles NG |
| Comp. Ex. 1-3 | $(Tb_{0.64}Y_{0.34}Sc_{0.02})_3(Al_{0.98}Sc_{0.02})_5O_{12}$ | 1,450 | 5 | air | 84.45 | 0.0053 | 1,070 | 12 | |
| Comp. Ex. 1-4 | $(Tb_{0.64}Y_{0.34}Sc_{0.02})_3(Al_{0.98}Sc_{0.02})_5O_{12}$ | omitted | omitted | omitted | 83.60 | 0.0237 | 940 | 34 | |

The samples of Examples wherein oxidative annealing treatment is carried out at 1,300° C. or higher for 10 hours or longer are successful in reducing the absorption coefficient at wavelength 1,064 nm and suppressing the variation of focal length by thermal lens to 10% or less. In contrast, the samples of Comparative Example 1-1 wherein the temperature of oxidative annealing treatment is low and Comparative Example 1-3 wherein the time of oxidative annealing treatment is short show a high absorption coefficient and a variation of focal length by thermal lens in excess of 10%. The sample of Comparative Example 1-2 wherein the temperature of oxidative annealing treatment is higher than 1,500° C. is acceptable from the aspect of thermal lens, but rejected because of noticeable scattering of bubbles and deteriorated laser quality. The sample of Comparative Example 1-4 wherein oxidative annealing treatment is omitted remains colored as a matter of course, has a high absorption coefficient, and cannot be used as the magneto-optical material for 100-W lasers.

The foregoing results demonstrate that when the temperature and time of oxidative annealing treatment are controlled in the desired ranges, a satisfactory annealing effect is expectable and the material is useful as a magneto-optical material accommodating 100-W power lasers. The compositions of Examples had a Verdet constant of 36 rad/(T·m).

Example 2

Samples of paramagnetic garnet type transparent ceramic material were prepared by the same procedure as in Example 1 except that the atmosphere of oxidative annealing treatment was changed from air to oxygen or nitrogen, and the temperature and time of oxidative annealing treatment were changed. They were evaluated as in Example 1.

The results are shown in Table 2.

TABLE 2

| | | Oxidative annealing treatment | | | Results | | | |
|---|---|---|---|---|---|---|---|---|
| | Composition | Temp. (° C.) | Time (h) | Atmosphere | Total light transmittance @ 900 mm (%) | Absorption coefficient @ 1.064 nm ($cm^{-1}$) | Minimum wavelength meeting \|a-b\| >0.1 | Variation of focal length by thermal lens |
| Example 2-1 | $(Tb_{0.64}Y_{0.34}Sc_{0.02})_3(Al_{0.98}Sc_{0.02})_5O_{12}$ | 1,300 | 50 | oxygen | 84.59 | 0.0024 | 1,190 | 8 |
| Example 2-2 | $(Tb_{0.64}Y_{0.34}Sc_{0.02})_3(Al_{0.98}Sc_{0.02})_5O_{12}$ | 1,450 | 20 | oxygen | 84.65 | 0.0011 | 1,210 | 3 |
| Comp. Ex. 2-1 | $(Tb_{0.64}Y_{0.34}Sc_{0.02})_3(Al_{0.98}Sc_{0.02})_5O_{12}$ | 1,450 | 5 | oxygen | 84.21 | 0.0105 | 1,060 | 16 |
| Comp. Ex. 2-2 | $(Tb_{0.64}Y_{0.34}Sc_{0.02})_3(Al_{0.98}Sc_{0.02})_5O_{12}$ | 1,450 | 20 | nitrogen | 83.90 | 0.0172 | 960 | 32 |

It is seen from Examples 2-1 and 2-2 that even when the atmosphere is changed from air to oxygen, a paramagnetic garnet type transparent ceramic material which can accommodate 100-W power lasers can be prepared. When the conditions of oxidative annealing treatment (treating time, herein) are outside the range as in Comparative Example 2-1, the resulting ceramic material cannot accommodate 100-W power lasers because of residual absorption. When annealing treatment is carried out in oxygen-free nitrogen atmosphere as in Comparative Example 2-2, oxygen deficits are not recovered, naturally resulting in substantial absorption.

Example 3

Samples of paramagnetic garnet type transparent ceramic material were prepared by the same procedure as in Example 2-2 except that the composition was changed. They were evaluated as in Example 1.

The results are shown in Table 3.

TABLE 3

| | | Oxidative annealing treatment | | | Results | | | | |
|---|---|---|---|---|---|---|---|---|---|
| | Composition | Temp. (° C.) | Time (h) | Atmosphere | Total light transmittance @ 900 mm (%) | Absorption coefficient @ 1,064 nm ($cm^{-1}$) | Minimum wavelength meeting \|a-b\| >0.1 λ1 (mm) | Variation of focal length by thermal lens (%) | Remarks |
| Example 3-1 | $(Tb_{0.8}Y_{0.18}Sc_{0.02})_3(Al_{0.95}Sc_{0.05})_5O_{12}$ | 1,450 | 20 | oxygen | 84.49 | 0.0024 | 1,200 | 9 | |

TABLE 3-continued

| | Composition | Oxidative annealing treatment Temp. (° C.) | Time (h) | Atmosphere | Results: Total light transmittance @ 900 mm (%) | Absorption coefficient @ 1,064 nm ($cm^{-1}$) | Minimum wavelength meeting \|a-b\| >0.1 λ1 (mm) | Variation of focal length by thermal lens (%) | Remarks |
|---|---|---|---|---|---|---|---|---|---|
| Example 3-2 | $(Tb_{0.6}Y_{0.34}Sc_{0.06})_3(Al_{0.93}Sc_{0.07})_5O_{12}$ | 1,450 | 20 | oxygen | 84.61 | 0.0019 | 1,210 | 4 | |
| Example 3-3 | $(Tb_{0.6}Y_{0.37}Sc_{0.03})_3(Al_{0.992}Sc_{0.008})_5O_{12}$ | 1,450 | 20 | oxygen | 84.63 | 0.0015 | 1,210 | 3 | |
| Example 3-4 | $(Tb_{0.60}Y_{0.30}Sc_{0.10})_3(Al_{0.83}Sc_{0.17})_5O_{12}$ | 1.450 | 20 | oxygen | 84.59 | 0.0021 | 1,180 | 7 | cost increase |
| Comp. Ex 3-1 | $(Tb_{0.6}Y_{0.4})_3(Al_{0.994}Sc_{0.006})_5O_{12}$ | 1,450 | 20 | oxygen | 84.48 | 0.0047 | 1,080 | 14 | |
| Comp. Ex 3-2 | $(Tb_{0.6}Y_{0.37}Sc_{0.03})_3(Al_{0.998}Sc_{0.002})_5O_{12}$ | 1.450 | 20 | oxygen | 84.41 | 0.0062 | 1,040 | 16 | |

It is seen from Examples 3-1 to 3-4 that even when the composition is changed, a paramagnetic garnet type transparent ceramic material which can accommodate 100-W power lasers can be prepared. When a large amount of Sc is added as in Example 3-4, the resulting material has a transmittance and absorption coefficient sufficient to accommodate 100-W power lasers. This example is less desirable because Sc leads to a cost increase. An optimum composition is defined in the invention whereas compositions outside the range of formula (1) fail to accommodate 100-W power lasers probably because the absorption attributable to cation defects is not fully eliminated. The theoretical transmittance is 84.60. in Example 3-1 and 84.70% in the other compositions.

Although the invention has been described with reference to the above embodiments, the invention is not limited thereto and can be changed within a scope that a person skilled in the art can conceive, such as other embodiments, additions, modifications and deletions, and any embodiments are included in the scope of the invention as long as the effects of the invention are exerted.

REFERENCE SIGNS LIST

100 Optical isolator
110 Faraday rotator
120 Polarizer
130 Analyzer
140 Magnet

The invention claimed is:

1. A paramagnetic garnet type transparent ceramic material which is a sintered body of Tb-containing rare earth aluminum garnet having the formula (1):

$$(Tb_{1-x-y}Y_xSc_y)_3(Al_{1-z}Sc_z)_5O_{12} \quad (1)$$

wherein 0.5≤x<0.45, 0<y≤0.1, and 0.004<z<0.2, wherein when a total light transmittance spectrum is determined across an optical path length of 24 mm, the total light transmittance at wavelength 900 nm is a % and the total light transmittance at an arbitrary wavelength λ on the wavelength side longer than 900 nm is b %, the paramagnetic garnet type transparent ceramic material meets |a−b|≤0.1 at least in the range: 900 nm<λ<1,100 nm.

2. The paramagnetic garnet type transparent ceramic material of claim 1, wherein the minimum wavelength λ1 on the wavelength side longer than 900 nm which meets |a−b|>0.1 is at least 1,100 nm.

3. The paramagnetic garnet type transparent ceramic material of claim 1, having an absorption coefficient of up to 0.0030 $cm^{-1}$ at wavelength 1,064 nm.

4. The paramagnetic garnet type transparent ceramic material of claim 1 wherein the total light transmittance at wavelength 900 nm is from 84% to 85%.

5. The paramagnetic garnet type transparent ceramic material of claim 1 wherein when laser light of wavelength 1,064 nm across the optical path length 24 mm enters at a beam diameter of 1.6 mm and an incident power of 100 W, a variation of focal length by a thermal lens is less than 10%.

6. A method of preparing the paramagnetic garnet type transparent ceramic material of claim 1, comprising the steps of:

pressure-sintering a sintered body of a Tb-containing rare earth aluminum garnet having the formula (1):

$$(Tb_{1-x-y}Y_xSc_y)_3(Al_{1-z}Sc_z)_5O_{12} \quad (1)$$

wherein 0.5≤x<0.45, 0<y≤0.1, and 0.004<z<0.2, heating the pressure-sintered body at a temperature higher than the pressure-sintering temperature for re-sintering to form a re-sintered body, and oxidatively annealing the re-sintered body in an atmosphere containing at least 15% by volume of oxygen at a temperature of 1,300° C. to 1,500° C. for at least 10 hours.

7. The method of preparing the paramagnetic garnet type transparent ceramic material according to claim 6 wherein the re-sintered body is pressure-sintered again before the oxidative annealing treatment is carried out.

8. The paramagnetic garnet type transparent ceramic material of claim 1 wherein in formula (1), y is a number in the range: 0.002≤y≤0.07.

9. The paramagnetic garnet type transparent ceramic material of claim 1 which has an average sintered grain size of from 10 μm to 40 μm.

* * * * *